United States Patent

[11] 3,612,258

[72] Inventor Wilbur W. Bagby
 105 Conover Drive, Birmingham, Ala. 35206
[21] Appl. No. 869,482
[22] Filed Oct. 27, 1969
[45] Patented Oct. 12, 1971

[54] BELT CLEANER
 5 Claims, 4 Drawing Figs.
[52] U.S. Cl. .................................................. 198/230, 74/230
[51] Int. Cl. .................................................. B65g 45/00, F16h 57/04
[50] Field of Search............................................. 198/230; 74/230

[56] References Cited
UNITED STATES PATENTS
2,652,242  9/1953  Sapp............................. 198/230 X
2,647,619  8/1953  Green........................... 198/230

Primary Examiner—Edward A. Sroka
Attorney—Jennings, Carter & Thompson

ABSTRACT: Endless belt cleaning unit having cylinder with plurality of angularly spaced, abrasion-resistant, resilient rods extending parallel to each other and in spaced relation to the outer surface of cylinder. Annular flanges carried by ends of cylinder retain rods in position to contact return flight of belt to impart rotation to cylinder and rods carried thereby.

PATENTED OCT 12 1971

INVENTOR.
Wilbur W. Bagby
BY
Jennings, Carter + Thompson
Attorneys

INVENTOR.
Wilbur W. Bagby
BY
Jennings, Carter & Thompson
Attorneys

3,612,258

BELT CLEANER

BACKGROUND OF THE INVENTION

This invention relates to a belt cleaner and more particularly to apparatus for removing adherent materials from the return flight of an endless belt conveyor after the major portion of the load on the conveyor has been discharged at the end of the conveyor by reversing the direction of movement of the belt around a head pulley.

Heretofore in the art to which my invention relates, difficulties have been encountered in removing adherent materials, such as coal, ores, feed materials and construction materials, such as sand, gravel and the like, due to the fact that the materials are very difficult to remove from the return flight of the belt and often adhere to the cleaning mechanism for the belt whereby it becomes clogged and no longer performs its intended function in an efficient manner.

BRIEF SUMMARY OF INVENTION

In accordance with my present invention, I provide belt-cleaning apparatus wherein a plurality of angularly spaced, abrasion-resistant, resilient rods extend parallel to each other and the outer surface of a supporting cylinder in position to engage the undersurface of the return flight of the endless conveyor. The resilient rods are approximately one-half inch in outside diameter and are spaced from each other whereby adherent materials are free to move between adjacent rods to thus provide a self-cleaning action as the rods are moved in a circular path upon engagement with the moving belt.

Apparatus embodying features of my invention is illustrated in the accompanying drawings, forming a part of this application, in which.

Figure 1:
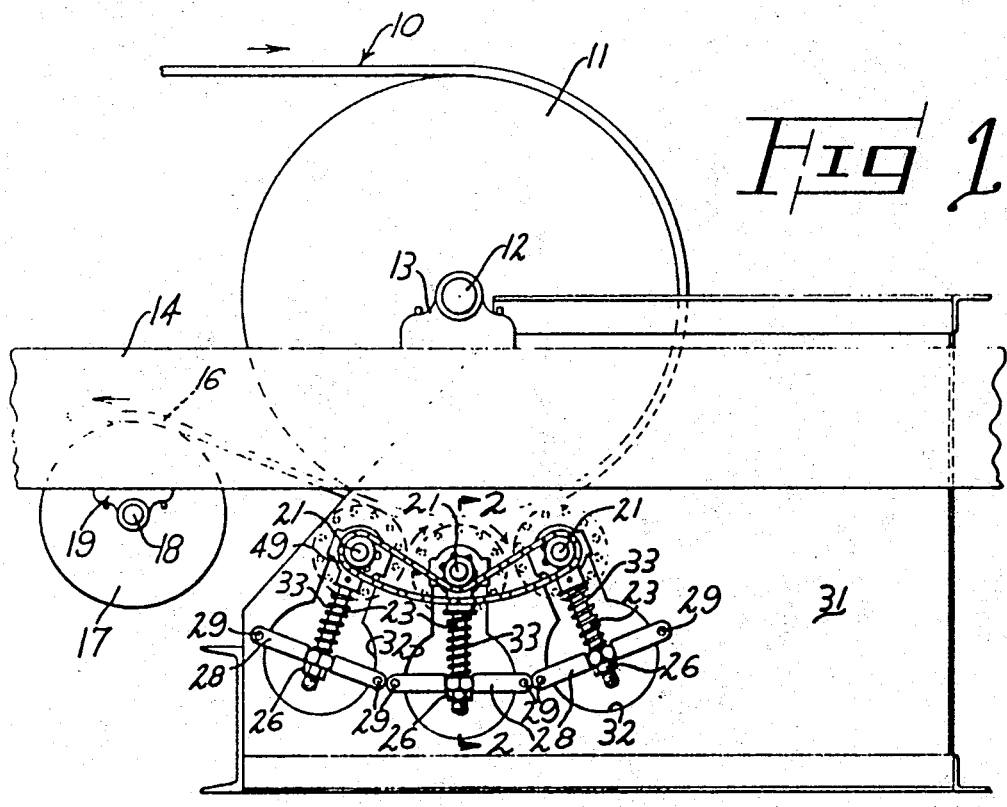
FIG. 1 is a side elevational view, partly broken away, showing my improved apparatus mounted subjacent an end pulley for an endless belt.
Figure 4:
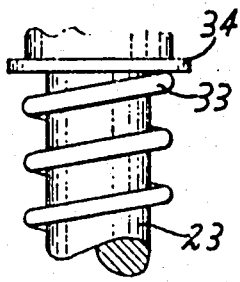
FIG. 4 is a fragmental view taken generally along the line 4—4 of FIG. 2.

Referring now to the drawings for a better understanding of my invention, I show an endless conveyor belt 10 passing around a head pulley 11 which is mounted on a shaft 12 which in turn is mounted for rotation in suitable bearings 13 carried by a supporting frame 14. The return flight of the conveyor belt 10, indicated at 16 is shown as passing around an idler pulley 17 mounted on a shaft 18 which in turn is supported by bearings 19. As is well known in the art to which my invention relates, the main portion of the materials conveyed by the endless conveyor 10 are discharged as the belt passes around the pulley 11 whereby only material which is adherent to the return flight 16 remains with the belt.

I show my improved cleaner unit as being mounted subjacent the pulley 11 in position to contact the return flight 16 of the conveyor belt 10. The cleaner unit is shown in FIG. 1 as comprising three transverse shafts 21 which are spaced from each other, as shown in FIG. 1. Each shaft 21 is supported adjacent opposite ends by a bearing member 22 which is mounted adjacent the upward end of a supporting rod 23 which is threaded adjacent its lower end, as at 24, for receiving a nut 26. Surrounding the rod 23 above nut 26 is a sleevelike member 27 which is adapted for axial movement relative to the rod 23. Laterally and outwardly extending support members 28 are secured to opposite sides of the sleevelike member 27, as shown in FIG. 1. The outer ends of the support members 28 are secured by bolts 29 to a vertical sidewall 31 whereby the rods 23 and their associated bearings 22 are supported from the vertical sidewall 31. Suitable openings 32 are provided in the sidewall 31 for receiving the upstanding rods 23 and their associated bearings 22 whereby the bearings 22 and the shafts 21 carried thereby are adapted for vertical movement upon axial movement of the rods 23. A compression spring 33 surrounds each upstanding rod 23 between the sleeve member 27 and a spring abutment 34 whereby each upstanding rod 23 and its bearing member 22 is urged upwardly.

Figure 2:
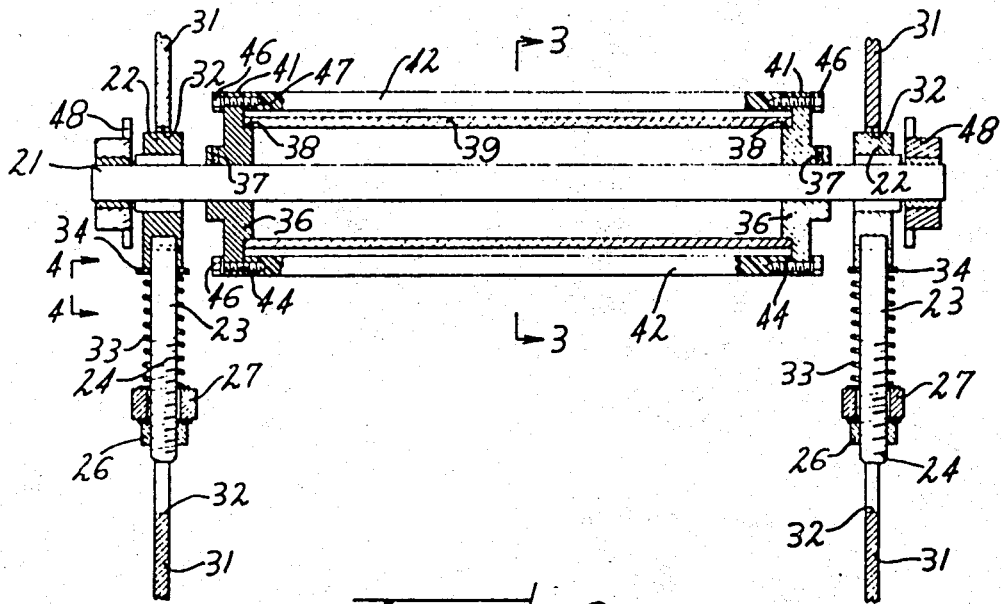
FIG. 2 is an enlarged sectional view, taken generally along the line 2—2 of FIG. 1.
Figure 3:
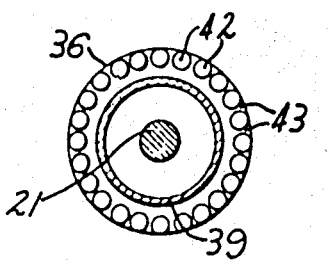
FIG. 3 is a sectional view taken generally along the line 3—3 of FIG. 2.

As shown in FIG. 2, each shaft 21 carries longitudinally spaced head members 36 with the head members being secured to the shaft 21 by suitable setscrews 37. The inner surface of each head 36 is reduced in diameter as at 38 for receiving the end of an elongated cylinder 39 which extends between the head members 36, as shown. Each head member 36 is provided with an annular, radially extending portion 41 which extends beyond the cylinder 39, as shown in FIG. 2.

Extending between the annular, radially extending portions 41 are a plurality of angularly spaced, abrasion-resistant, resilient rodlike members 42. Each rodlike member 42 extends generally parallel to and in spaced relation to the outer surface of cylinder 39. Also, the rodlike members 42 are spaced from each other to provide a clearance 43 between adjacent rodlike members 42. By providing the space between adjacent rodlike members, the apparatus is self cleaning in operation as the rodlike members engage the undersurface of the return flight 16 of conveyor 10 That is, the rodlike members 42 are supported in position to engage the return flight 16 whereby upon movement of the return flight 16, motion is imparted to the rodlike members 42 whereby the head members 36 and their associated shafts 21 are rotated.

The rodlike members 42 are formed of an abrasive resistant plastic material having a durometer hardness ranging from approximately 80 to 100. Preferably, the plastic material from which the rodlike member 42 is formed has a durometer hardness of approximately 90. The outside diameter of each rodlike member 42 is approximately one-half inch whereby the clearance 43 is provided between adjacent rodlike members to permit free movement of materials therebetween which have been removed from the return flight 16 of conveyor belt 10. Angularly spaced openings 44 are provided through the head members 36 in position to receive retaining bolts 46 which engage threaded openings 47 provided adjacent the end of each rodlike member 42, as shown in FIG. 2.

As shown in FIGS. 1 and 2, sprockets 48 are carried by the ends of the shafts 21 for receiving sprocket chains 49. The sprocket chain 49 passes around the sprockets 48 of the outermost shafts 21 and passes beneath the sprocket 48 of the centrally disposed shaft 21, as shown in FIG. 1, whereby reverse motion is imparted to the centrally disposed shaft 21. Since the forces imparted to the rodlike members 42 carried by the outermost shafts 21 combined, is greater than the force imparted to the rodlike members 42 carried by the centrally disposed shaft 21, the outermost shafts 21 travel in a counterclockwise direction, as viewed in FIG. 1 while the centrally disposed shaft 21 travels in a clockwise direction, as indicated by the arrows in FIG. 1. Accordingly, the rodlike members 42 carried by the centrally disposed shaft 21 rotate in a direction opposite the direction of movement of the undersurface of the return flight 16 whereby the belt is thoroughly cleaned of adherent materials.

From the foregoing, it will be seen that I have devised an improved belt cleaner. By providing angularly spaced rodlike members 42 which extend parallel to each other and the outer surface of a cylindrical member 39 and are spaced from each other and the outer surface of the cylinder, a clearance is provided for free movement of materials removed from the conveyor belt. By forming the rodlike members of an abrasive-resistant, resilient material, of a durometer hardness ranging from approximately 80 to 100, the rodlike members 42 thoroughly clean the adjacent surface of the return flight 16 and at the same time move or flex outwardly away from the belt when large obstructions move between the return flight 16 and the rod 42. Also, by providing resilient means which permits the shaft 21 to move toward and away from the return flight 16, the rodlike members are urged continuously into firm engagement with the undersurface of the return flight and at the same time free movement of the rodlike members is permitted in a downward direction to prevent damage to the belt cleaner in the event large obstructions pass between the rodlike members and the conveyor belt. Furthermore, by rotating the rodlike members carried by the centrally disposed shaft in a direction opposite the direction of the outermost shafts 21, my improved apparatus is efficient in operation and thoroughly cleans the material adhered to the return flight 16.

While I have shown my invention in but one form, it ill be obvious to those skilled in the art that it is not so limited, but is susceptible of various other changes and modifications without departing from the spirit thereof.

What I claim is:

1. Apparatus for cleaning adherent materials from the return flight of an endless belt conveyor comprising:
    a. at least three parallel cylindricallike members mounted on shafts for free rotation adjacent and transversely of said return flight,
    b. a radially extending annular flange adjacent each end of said cylindricallike members,
    c. a plurality of angularly spaced abrasion-resistant, resilient rodlike members extending generally parallel to each other between said annular flanges in spaced relation to each other and the outer surface of said cylindricallike member,
    d. means securing said annular flanges to the ends of said rodlike members adjacent thereto positioning said rodlike members in contact with the adjacent moving surfaces of said return flight, whereby motion is imparted to said rodlike member,
    e. a rotatable member mounted on each said shaft and adapted for rotation therewith, and
    f. an endless drive member passing around the rotatable members which are carried by the outermost shafts with one flight of said endless drive member in driving engagement with at least one intermediate rotatable member imparting reverse motion to adjacent shafts so that the combined force imparted to the shafts rotating in the direction of the outermost shafts is greater than the force imparted to the other shafts whereby said shafts are operatively connected to each other and the rodlike members carried by said other shafts rotate in a direction opposite the direction of movement of the undersurface of said return flight of said endless belt conveyor.

2. Apparatus for cleaning adherent materials from the return flight of an endless belt conveyor as defined in claim 1 in which said rodlike members have a durometer hardness ranging from approximately 80 to 100.

3. Apparatus for cleaning adherent materials from the return flight of an endless belt conveyor as defined in claim 1 in which said rodlike members are plastic members having a durometer hardness of approximately 90.

4. Apparatus for cleaning adherent materials from the return flight of an endless belt conveyor as defined in claim 1 in which said rodlike members are approximately one-half inch in outside diameter.

5. Apparatus for cleaning adherent materials from the return flight of an endless conveyor belt as defined in claim 1 in which resilient means urges said cylindrical member and the rodlike members carried thereby toward said return flight.